(12) United States Patent
Tanaka

(10) Patent No.: US 11,976,141 B2
(45) Date of Patent: May 7, 2024

(54) POLYETHYLENE POWDER AND MOLDED ARTICLE OBTAINED BY MOLDING THE SAME

(71) Applicant: Asahi Kasei Kabushiki Kaisha, Tokyo (JP)

(72) Inventor: Kenya Tanaka, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 429 days.

(21) Appl. No.: 17/435,069

(22) PCT Filed: Feb. 28, 2020

(86) PCT No.: PCT/JP2020/008227
§ 371 (c)(1),
(2) Date: Aug. 31, 2021

(87) PCT Pub. No.: WO2020/179650
PCT Pub. Date: Sep. 10, 2020

(65) Prior Publication Data
US 2022/0162355 A1 May 26, 2022

(30) Foreign Application Priority Data
Mar. 1, 2019 (JP) .............................. 2019-037372

(51) Int. Cl.
| | |
|---|---|
| C08F 10/02 | (2006.01) |
| C08F 4/659 | (2006.01) |
| C08F 110/02 | (2006.01) |
| C08F 210/16 | (2006.01) |
| C08J 5/18 | (2006.01) |
| C08J 9/24 | (2006.01) |
| C08J 9/28 | (2006.01) |
| D01F 6/04 | (2006.01) |

(52) U.S. Cl.
CPC .............. *C08F 10/02* (2013.01); *C08J 9/24* (2013.01); *D01F 6/04* (2013.01); *C08F 2420/00* (2013.01); *C08J 2323/04* (2013.01)

(58) Field of Classification Search
None
See application file for complete search history.

(56) References Cited

U.S. PATENT DOCUMENTS

| | | | | |
|---|---|---|---|---|
| 4,246,390 | A * | 1/1981 | Seaver ................... | B29C 43/52 523/307 |
| 10,544,240 | B2 * | 1/2020 | Tanaka ................... | C08F 6/02 |
| 10,597,796 | B2 * | 3/2020 | Tanaka ................... | C08F 110/02 |
| 2015/0284484 | A1 | 10/2015 | Zhou et al. | |
| 2015/0299903 | A1 † | 10/2015 | Akio | |
| 2018/0273708 | A1 * | 9/2018 | Kikuchi ................... | A61L 27/16 |
| 2019/0002611 | A1 | 1/2019 | Hamada | |
| 2019/0359740 | A1 * | 11/2019 | Tanaka ................... | C08J 5/18 |
| 2021/0032446 | A1 * | 2/2021 | Tanaka ................... | B29C 43/003 |

FOREIGN PATENT DOCUMENTS

| | | |
|---|---|---|
| CN | 103865145 A | 6/2014 |
| CN | 104725691 A | 6/2015 |
| CN | 108219242 A | 6/2018 |
| CN | 108456273 A | 8/2018 |
| CN | 108503923 A | 9/2018 |
| CN | 108864523 A | 11/2018 |
| EP | 3650475 A1 | 5/2020 |
| JP | 2014-040525 A | 3/2014 |
| JP | 2015-120784 A | 7/2015 |
| JP | 2015120784 A2 † | 7/2015 |
| JP | 2016-176061 A | 10/2016 |
| JP | 2017-088773 A | 5/2017 |
| JP | 2017088773 A2 † | 5/2017 |
| JP | 2017-145306 A | 8/2017 |
| JP | 6195403 B1 | 9/2017 |
| JP | 2018-095862 A | 6/2018 |
| JP | 2018-131596 A | 8/2018 |
| JP | 2018131596 A2 † | 8/2018 |
| JP | 2018-141136 A | 9/2018 |
| JP | 2018-145412 A | 9/2018 |
| JP | 2019-038931 A | 3/2019 |

OTHER PUBLICATIONS

International Preliminary Report on Patentability and Written Opinion issued in corresponding International Patent Application No. PCT/JP2020/008227 dated Sep. 16, 2021.
European Search Report issued in related European Patent Application No. 20766732.0 dated Apr. 13, 2022.
International Search Report issued in corresponding International Patent Application No. PCT/JP2020/008227 dated May 19, 2020.

* cited by examiner
† cited by third party

*Primary Examiner* — Melissa A Rioja
(74) *Attorney, Agent, or Firm* — Morgan, Lewis & Bockius LLP

(57) ABSTRACT

A polyethylene powder having a limiting viscosity [η] of 2.0 dl/g or more and less than 20.0 dl/g as measured in decalin at 135° C., wherein the polyethylene powder presents a percentage decrease from a specific surface area A measured by the BET method before heating at 120° C. for 5 h to a specific surface area B measured by a BET method after heating at 120° C. for 5 h, ((A−B)/A×100), of 0.1% or more and less than 35%.

20 Claims, No Drawings

POLYETHYLENE POWDER AND MOLDED ARTICLE OBTAINED BY MOLDING THE SAME

TECHNICAL FIELD

The present invention relates to a polyethylene powder and a molded article obtained by molding the same.

BACKGROUND ART

Polyethylene is used in a wide variety of applications such as films, sheets, microporous membranes, fibers, foams, and pipes. The reason why polyethylene is used is that polyethylene is easy to melt-process, and that the resulting molded article has high mechanical strength and is also excellent in chemical resistance, rigidity, and the like. Especially, ultrahigh molecular weight polyethylene has a high molecular weight, and therefore it has higher mechanical strength and is excellent in sliding properties and wear resistance and also excellent in chemical stability and long-term reliability.

However, ultrahigh molecular weight polyethylene has low fluidity even if melted at a temperature equal to or more than the melting point. Therefore, a compression molding method in which a polyethylene powder is compression-molded under heating and then cut, or a method for molding a polyethylene powder into the form of a sheet or a thread in which the polyethylene powder is dissolved in a solvent such as a liquid paraffin followed by stretching and solvent removal is applied, for example.

Ultrahigh molecular weight polyethylene is molded in a powder form. Compared with pellets, a powder has a large surface area and has fine pores in the powder, and therefore the form, surface state, crystal state, pore state, and the like of the powder change during heating. Therefore, it is extremely important to adjust the powder to a suitable temperature during fabrication including dissolution and compression. In the case of compression molding, unless the preheating temperature before compression is suitable, bubbles may remain in the resulting molded article, or strain may remain in the resulting molded article to result in deformation after cooling.

For the state of pores of a polyethylene powder, for example, Patent Document 1 discloses that when a polyethylene powder has the specific surface area as determined by the BET method and the pore volume as determined by a mercury intrusion method in suitable ranges, the polyethylene powder dissolves rapidly in a solvent, and a molded article having a small number of undissolved material spots is obtained.

In addition, Patent Document 2 discloses that when the ratio between the median diameter and mode diameter of pores as measured by a mercury intrusion method is adjusted to a value in a suitable range, a molded article having a small number of undissolved material spots is obtained.

LIST OF PRIOR ART DOCUMENTS

Patent Document
Patent Document 1: Japanese Patent Laid-Open No. 2017-88773
Patent Document 2: Japanese Patent Laid-Open No. 2017-145306

SUMMARY OF INVENTION

Problems to be Solved by Invention

As described above, it is discloses that powder characteristics, specifically, the specific surface area and the pore volume in Patent Document 1 and the pore diameter of a powder in Patent Document 2, can be tailored to obtain a molded article having a small number of undissolved material spots. In recent years, however, polyethylene powders having higher fabricability (solubility and dispersibility) have been required.

The present invention has been made under the above circumstances, and it is an object of the present invention to provide a polyethylene powder excellent in solubility and dispersibility and a molded article (for example, a molded article obtained through stretching, a microporous membrane, and a fiber) of high quality (for example, being uniform, including a small amount of the undissolved material, and being excellent in dimensional accuracy) obtained by molding such a polyethylene powder.

Means for Solving Problems

The present inventor has diligently pursued studies in order to solve the problem, and as a result, has found that a polyethylene powder which has a predetermined limiting viscosity [η] and in which the percentage decrease of the specific surface area before and after heating at 120° C. for 5 h is controlled in a particular range can solve the problem, and has completed the present invention.

Specifically, the present invention is as follows.

[1]
A polyethylene powder having a limiting viscosity [η] of 2.0 dL/g or more and less than 20.0 dL/g as measured in decalin at 135° C., wherein
the polyethylene powder presents a percentage decrease from a specific surface area A measured by the BET method before heating at 120° C. for 5 h to a specific surface area B measured by a BET method after heating at 120° C. for 5 h, ((A−B)/A×100), of 0.1% or more and less than 35%.

[2]
The polyethylene powder according to [1], wherein the polyethylene powder presents a slope of a linear approximation formula obtained from amounts adsorbed in a relative pressure range of 0.120 to 0.200, as measured by the BET method, of 0.03 or more and less than 0.20.

[3]
The polyethylene powder according to [1] or [2], wherein the polyethylene powder has a specific surface area of 0.05 m$^2$/g or more and less than 0.35 m$^2$/g as measured by the BET method after heating at 120° C. for 5 h.

[4]
The polyethylene powder according to any of [1] to [3], wherein the percentage decrease from the specific surface area A measured by the BET method before heating at 120° C. for 5 h to the specific surface area B measured by the BET method after heating at 120° C. for 5 h, ((A−B)/A×100), is 10% or more and less than 35%.

[5]
The polyethylene powder according to any of [1] to [4], wherein the polyethylene powder presents a slope of the linear approximation formula obtained from the amounts adsorbed in relative pressure range of 0.120 to 0.200, as measured by the BET method, of 0.07 or more and less than 0.18.

[6]
The polyethylene powder according to any of [1] to [5], wherein a content of a particle having a particle diameter of less than 106 μm is 10.0% by mass or more and less than 50.0% by mass, and
a content of a particle having a particle diameter of less than 53 μm is less than 3.0% by mass.

[7]

The polyethylene powder according to any of [1] to [6], wherein the polyethylene powder has a compacted apparent bulk density of 0.50 g/cm³ or more and 0.65 g/cm³ or less.

[8]

The polyethylene powder according to any of [1] to [7], wherein a compressive strength at 10% displacement of a particle having a particle diameter of 100 μm is 4.0 MPa or more and less than 10.0 MPa.

[9]

The polyethylene powder according to any of [1] to [8], wherein a proportion of a component having a molecular weight of less than 10,000 as determined by gel permeation chromatography (GPC) is less than 5%.

[10]

The polyethylene powder according to any of [1] to [9], wherein a total content of Al, Ti, Zr, and Hf is 1 ppm or more and 10 ppm or less, and a content of chlorine is less than 30 ppm.

[11]

A molded article obtained by molding the polyethylene powder according to any of [1] to [10].

[12]

The molded article according to [11], wherein the molded article is a microporous membrane, a high strength fiber, or a porous sintered body.

Advantages of Invention

According to the present invention, provided are a polyethylene powder excellent in solubility and dispersibility and also a molded article obtained by molding the same (for example, a microporous membrane, a high strength fiber, and a porous sintered body) of high quality (for example, being uniform, including a small amount of the undissolved material, and being excellent in dimensional accuracy).

Mode for Carrying Out Invention

A mode for carrying out the present invention (hereinafter also referred to as the "present embodiment") will be described in detail below. The present invention is not limited to the present embodiment, and various modifications can be made without departing from the spirit thereof.

(Polyethylene Powder)

The polyethylene powder of the present embodiment has a limiting viscosity [η] of 2.0 dL/g or more and less than 20.0 dL/g as measured in decalin at 135° C., and presents a percentage decrease from the specific surface area A measured by the BET method before heating at 120° C. for 5 h to the specific surface area B measured by the BET method after heating at 120° C. for 5 h, ((A−B)/A×100), of 0.1% or more and less than 35%. The polyethylene powder of the present embodiment, which meets such requirements, is excellent in solubility and dispersibility in a solvent, and can provide a molded article (for example, a microporous membrane, a high strength fiber, and a porous sintered body) of high quality (for example, being uniform, including a small amount of the undissolved material, and being excellent in dimensional accuracy). The above requirements will be described below.

The polyethylene used in the present embodiment is not particularly limited, and preferred examples thereof include an ethylene homopolymer or a copolymer of ethylene and another comonomer. Another comonomer is not particularly limited, and examples thereof include α-olefins and vinyl compounds.

The α-olefins are not particularly limited, and examples thereof include α-olefins having 3 to 20 carbon atoms. Specific examples include propylene, 1-butene, 4-methyl-1-pentene, 1-hexene, 1-octene, 1-nonene, 1-decene, 1-undecene, 1-dodecene, 1-tridecene, and 1-tetradecene. Further, the vinyl compounds are not particularly limited, and examples thereof include vinylcyclohexane, styrene, and derivatives thereof. As another comonomer, nonconjugated polyenes such as 1,5-hexadiene and 1,7-octadiene can also be used as needed.

The copolymer may be a ternary random polymer. The other comonomers may be used singly or in combinations of two or more thereof.

The amount of the other comonomer is not particularly limited but is preferably less than 0.5 mol %, more preferably less than 0.4 mol %, and further preferably less than 0.3 mol % based on ethylene in view of the rigidity and heat resistance of the polyethylene powder. The amounts of the comonomers of the polyethylene can be measured by an infrared analysis method, an NMR method, or the like.

The density of the polyethylene used in the present embodiment is not particularly limited but is preferably 910 kg/cm³ or more and less than 980 kg/cm³, more preferably 915 kg/m³ or more and less than 970 kg/cm³, and further preferably 920 kg/m³ or more and less than 965 kg/cm³ in view of rigidity and heat resistance. The density of the polyethylene can be obtained by measuring according to JIS K 7112 on a sample for measuring the density, the sample obtained by cutting a section from a pressed sheet of the polyethylene powder, annealing it at 120° C. for 1 h, and then cooling it at 25° C. for 1 h. The pressed sheet of the polyethylene powder can be fabricated according to ASTM D 1928 Procedure C using a mold 60 mm long, 60 mm wide, and 2 mm thick.

(Limiting Viscosity [η])

The polyethylene powder of the present embodiment has a limiting viscosity [η] of 2.0 dL/g or more and less than 20.0 dL/g, preferably 3.0 dL/g or more and less than 18.0 dL/g, and more preferably 4.0 dL/g or more and less than 16.0 dL/g as measured in decalin at 135° C. The limiting viscosity [η] of the polyethylene powder can be adjusted, for example, by appropriately using polymerization conditions and the like described later. Specifically, the limiting viscosity [η] of the polyethylene powder can be adjusted by, for example, allowing hydrogen to be present in the polymerization system as a chain transfer agent or changing the polymerization temperature.

Since the polyethylene powder of the present embodiment has a limiting viscosity [η] of 2.0 dL/g or more, the melt flow of polyethylene in a high temperature environment is suppressed, and the pores in the polyethylene powder are thus easily maintained to improve the meltability in a solvent. In addition, a molded article such as a microporous membrane or a high strength fiber containing the polyethylene powder of the present embodiment has sufficient mechanical strength. On the other hand, since the polyethylene powder of the present embodiment has a limiting viscosity [η] of less than 20.0 dL/g, the melt fluidity of polyethylene in a high temperature environment improves, and the fabricability thus tends to be excellent. Therefore, when the polyethylene powder of the present embodiment is molded into a film or a membrane, there is no undissolved powder, and the strain generated upon molding is also easily relieved, which result in a molded article excellent in strength.

The limiting viscosity [η] of the polyethylene powder of the present embodiment can be obtained by preparing solutions of the polyethylene powder in decalin at different concentrations, measuring the solution viscosity of the solutions at 135° C., calculating the reduced viscosity from the found solution viscosity, and extrapolating the reduced viscosity to zero concentration. Specifically, the limiting viscosity [η] can be measured by a method described in Examples described later.

(Percentage Decrease of Specific Surface Area Before and after Heating at 120° C. for 5 h)

The polyethylene powder of the present embodiment presents a percentage decrease from the specific surface area A measured by the BET method before heating at 120° C. for 5 h to the specific surface area B measured by the BET method after heating at 120° C. for 5 h ((A−B)/A×100, hereinafter also described as "the percentage decrease of the specific surface area before and after heating at 120° C. for 5 h") of 0.1% or more and less than 35%, preferably 10% or more and less than 35%, more preferably 12% or more and less than 33%, and further preferably 14% or more and less than 31%. Since the polyethylene powder of the present embodiment presents a percentage decrease of the specific surface area before and after heating at 120° C. for 5 h of 0.1% or more, the powder can deform easily at a temperature at which molecular weight decrease due to the pyrolysis of polyethylene is suppressed. Therefore, the moldability is excellent and the strain generated upon molding is small, which result in a molded article that is uniform and has few defects. In addition, in the step of dissolving the powder in a solvent, the pore diameter in the powder, the pore volume, and the specific surface area change in the process of increasing the temperature of the powder, and therefore the solvent is easily physically incorporated into the interior of the powder, which tends to result in excellent solubility of the powder.

On the other hand, since the polyethylene powder of the present embodiment presents a percentage decrease of the specific surface area before and after heating at 120° C. for 5 h of less than 35%, the pores are easily maintained even in the process of increasing the temperature of the powder, and therefore in the step of dissolving the powder in a solvent, the solvent easily penetrates into the interior of the powder before the powder melts. As a result, the dissolution rate of the powder is fast, and the powder thus tends to be excellent in solubility. If heating is performed in a state in which the solvent is not sufficiently impregnated into the interior of the powder, only the powder surface in contact with the solvent dissolves first, and the powder particles fuse and aggregate during kneading. Since the interior of the aggregates of the powder is in a solvent-insufficient state, the undissolved powder remains, and the dissolution rate is slow. Thus, a nonuniform gel forms in which polyethylene molecular chains do not diffuse sufficiently, and the molded article is also nonuniform. Therefore, it is extremely important that the solvent can be sufficiently impregnated during temperature increase.

In compression molding, generally, a mold is filled with a powder, and then heated before compression; however, if the pores in the vicinity of the powder surface are closed by melting, bubbles are trapped in the interior of the powder. When the powder is compressed in such a state, the bubbles remain in the molded article, and thus the dynamic strength tends to decrease significantly. When a powder is compression-molded at low temperature in order to maintain the pores, the powder does not have sufficient melt fluidity, and strain generated upon molding remains after cooling. Therefore, the problem of the deformation of the molded article tends to arise.

In an exemplary method for adjust the percentage decrease of the specific surface area before and after heating at 120° C. for 5 h to 0.1% or more and less than 35% in the polyethylene powder, a catalyst that fractures easily is used during polymerization to increase the initial activity of the polymerization to uniformly distribute pores having a moderate diameter in the powder, and further, in a drying step, the solvent contained in the powder is volatilized at a suitable rate to rearrange the crystal to thereby form communicating holes coupled to extremely fine pores to increase the heat resistance. Another exemplary method includes suppressing side reactions in the polymerization system and after polymerization.

Examples of specific methods include performing continuous polymerization in which ethylene gas, a solvent, a catalyst, and the like are continuously supplied into a polymerization system and continuously discharged together with the produced polyethylene; introducing ethylene gas from two places, the bottom and middle portion of a reactor, and directing the ethylene gas supply ports to the side of the direction in which the stirring blade rotates; using a solid catalyst having a compressive strength of less than 5 MPa as a catalyst and supplying it at the same temperature as the polymerization temperature; adjusting the temperature of a flash tank to 50° C. or less and introducing an alcohol to deactivate the catalyst; adjusting the solvent content in the polyethylene powder before drying to 70% by mass or more and less than 150% by mass; and performing the drying of the polyethylene powder at a temperature of 100° C. or more and 110° C. or less while blowing an inert gas at a flow rate of 10 m$^3$/h or more to remove the volatilized solvent. The percentage decrease of the specific surface area before and after heating at 120° C. for 5 h can be measured by the BET method under the condition of a measurement temperature of −196° C. using krypton for an adsorption gas. Specifically, the percentage decrease of the specific surface area before and after heating at 120° C. for 5 h can be measured by a method described in Examples described later.

(Specific Surface Area after Heating at 120° C. for 5 h)

The polyethylene powder of the present embodiment has a specific surface area of preferably 0.05 m$^2$/g or more and less than 0.35 m$^2$/g, more preferably 0.10 m$^2$/g or more and less than 0.35 m$^2$/g, further preferably 0.12 m$^2$/g or more and less than 0.33 m$^2$/g, and still further preferably 0.14 m$^2$/g or more and less than 0.30 m$^2$/g as measured by the BET method after heating at 120° C. for 5 h. When the polyethylene powder of the present embodiment has a specific surface area of 0.05 m$^2$/g or more as measured by the BET method after heating at 120° C. for 5 h, a solvent is easily impregnated into the powder, and the dissolution rate thus tends to be fast. In addition, the specific surface area of a resulting porous sintered body also tends to be large, and the gas permeability, the adsorption properties, and the impurity filtration-separation performance thereof are excellent.

On the other hand, when the polyethylene powder of the present embodiment has a specific surface area of less than 0.35 m$^2$/g as measured by the BET method after heating at 120° C. for 5 h, a solvent is allowed to easily penetrate into the powder by capillarity, and the powder thus tends to be excellent in solubility. Furthermore, the powder has high strength and is thus less likely to fracture, which leads to a small amount of a fine powder. Accordingly, there is no adhesion to a reaction vessel, or the like, which results in excellent productivity, and the handling properties also tend to improve.

Examples of the method for adjusting the specific surface area of the polyethylene powder measured by the BET method after heating at 120° C. for 5 h to 0.05 m²/g or more and less than 0.35 m²/g include performing continuous polymerization in which ethylene gas, a solvent, a catalyst, and the like are continuously supplied into a polymerization system and continuously discharged together with the produced polyethylene; introducing ethylene gas from two places, the bottom and middle portion of a reactor, and directing the ethylene gas supply ports to the side of the direction in which the stirring blade rotates; using a solid catalyst having a compressive strength of less than 5 MPa as a catalyst and supplying it at the same temperature as the polymerization temperature in a state in which fine particles are thoroughly removed by washing; adjusting the temperature of a flash tank to 50° C. or less and introducing an alcohol to deactivate the catalyst; adjusting the solvent content in the polyethylene powder before drying to 70% by mass or more and less than 150% by mass; and performing drying of the polyethylene powder at a temperature of 105° C. while blowing an inert gas at a flow rate of 10 m³/h or more to remove the volatilized solvent.

(Slope of Linear Approximation Formula of Amounts Adsorbed in Relative Pressure Range of 0.120 to 0.200)

In the polyethylene powder of the present embodiment, the slope of the linear approximation formula obtained from the amounts adsorbed in a relative pressure range of 0.120 to 0.200, as measured by the BET method (hereinafter also referred to as "the slope of the linear approximation formula of the amounts adsorbed in a relative pressure range of 0.120 to 0.200"), is preferably 0.03 or more and less than 0.20, more preferably 0.05 or more and less than 0.19, and further preferably 0.07 or more and less than 0.18. When the polyethylene powder of the present embodiment presents a slope of the linear approximation formula of the amounts adsorbed in a relative pressure range of 0.120 to 0.200 of 0.03 or more, the pore diameter distribution in the powder is wide, and the pores easily form coupled holes, which tend to result in high solvent-impregnating properties and therefore excellent solubility.

On the other hand, when the polyethylene powder of the present embodiment presents a slope of the linear approximation formula of the amounts adsorbed in a relative pressure range of 0.120 to 0.200 of less than 0.20, the powder has high strength and is thus less likely to fracture, which leads to a small amount of a fine powder is small. Accordingly, there is no adhesion to a reaction vessel, or the like, which results in excellent productivity, and the handling properties also tend to improve.

Examples of the method for adjusting the slope of the linear approximation formula of the amounts adsorbed in a relative pressure range of 0.120 to 0.200 to the polyethylene powder to 0.03 or more and less than 0.20 include performing continuous polymerization in which ethylene gas, a solvent, a catalyst, and the like are continuously supplied into a polymerization system and continuously discharged together with the produced polyethylene; introducing ethylene gas from two places, the bottom and middle portion of a reactor, and directing the ethylene gas supply ports to the side of the direction in which the stirring blade rotates; using a solid catalyst having a compressive strength of less than 5 MPa as a catalyst and supplying it at the same temperature as the polymerization temperature in a state in which fine particles are thoroughly removed by washing; adjusting the temperature of a flash tank to 50° C. or less and introducing an alcohol to deactivate the catalyst; adjusting the solvent content in the polyethylene powder before drying to 70% by mass or more and less than 150% by mass; and performing drying of the polyethylene powder at a temperature of 105° C. while blowing an inert gas at a flow rate of 10 m³/h or more to remove the volatilized solvent. The amounts adsorbed in a relative pressure range of 0.120 to 0.200 to the polyethylene powder can be measured by a method described in Examples described later.

(Content of Particles Having Particle Diameter of Less Than 106 μm)

In the polyethylene powder of the present embodiment, the content of a polyethylene powder (particles) having a particle diameter of less than 106 μm is preferably 10.0% by mass or more and less than 50.0% by mass, more preferably 13.0% by mass or more and less than 47.0% by mass, and further preferably 16.0% by mass or more and less than 44.0% by mass. When the content of the polyethylene powder having a particle diameter of less than 106 μm is 10.0% by mass or more and less than 50.0% by mass, the dissolution rate of the powder tends to be fast. For the polyethylene powder having a particle diameter of less than 106 μm, the time to complete dissolution is short, and the polyethylene powder is effective in increasing the viscosity of the slurry after dissolution to increase the shear during kneading, and as a result, effective in increasing the dissolution rate of the entire powder. The measurement of the content of the polyethylene powder having a particle diameter of less than 106 μm can be performed by a method described in Examples described later.

(Content of Particles Having Particle Diameter of Less Than 53 μm)

In the polyethylene powder of the present embodiment, the content of a polyethylene powder (particles) having a particle diameter of less than 53 μm is preferably less than 3.0% by mass, more preferably less than 2.0% by mass, and further preferably less than 1.0% by mass in view of the aggregation properties of the powder and of the air permeability of a molded article. In the polyethylene powder having a particle diameter of less than 53 μm, the pores tend to disappear and also the powder tends to dissolve too fast in the process of increasing the temperature of the powder, which may result in fusion and therefore aggregate of the powder particles during kneading. In addition, in a molded article such as a porous sintered body, the pores are filled, and therefore problems such as a decrease in air permeability may arise. Therefore, the content of the polyethylene powder (particles) having a particle diameter of less than 53 μm is preferably lower. The lower limit of the content of the polyethylene powder (particles) having a particle diameter of less than 53 μm is, for example, 0.1% by mass.

The content of the particles having a particle diameter of less than 53 μm can be controlled in the above numerical value range, for example, by using, as a catalyst used for the polymerization of polyethylene, a catalyst from which catalyst particles having too small a particle diameter have been removed. In addition, the content of the particles having a particle diameter of less than 53 μm can be controlled by controlling conditions when polymerizing polyethylene, and, for example, the content of the particles having a particle diameter of less than 53 μm can be controlled by lowering the polymerization pressure or shortening the residence time in the reactor.

The content of the polyethylene powder (particles) having a particle diameter of less than 53 μm can be obtained as the proportion of the weight of particles that pass through a sieve having an opening of 53 μm to all particles. The measurement of the content of the polyethylene powder having a particle diameter of less than 53 μm can be performed by a method described in Examples described later.

(Compacted Apparent Bulk Density)

The compacted apparent bulk density of the polyethylene powder of the present embodiment is preferably 0.50 g/cm$^3$ or more and less than 0.65 g/cm$^3$, more preferably 0.53 g/cm$^3$ or more and less than 0.63 g/cm$^3$, and further preferably 0.55 g/cm$^3$ or more and less than 0.60 g/cm$^3$. The compacted apparent bulk density tends to increase as the polyethylene powder includes smaller amounts of powder aggregates and powder having an irregular shape, is closer to a spherical shape with a regular surface configuration, and has smaller pore volume. When the compacted apparent bulk density is 0.50 g/cm$^3$ or more and less than 0.65 g/cm$^3$, the durability against external stress is excellent, and the amounts of powder having an irregular shape and powder aggregates having different solubility are small, which leads to excellent fluidity. Therefore, the handling properties tend to be better in introducing the polyethylene powder into a hopper or the like and measuring from the hopper. In addition, the solubility of the entire polyethylene powder tends to improve, and exhibiting uniform solubility tends to decrease the undissolved powder.

A polyethylene powder having a compacted apparent bulk density of 0.50 g/cm$^3$ or more and less than 0.65 g/cm$^3$ can be synthesized using, for example, a general Ziegler-Natta catalyst or metallocene catalyst, but a catalyst described later is preferably used. The compacted apparent bulk density can be adjusted by, for example, adjusting the temperature of a flash tank to 50° C. or less and introducing an alcohol to deactivate the catalyst; adjusting the solvent content in the polyethylene powder before drying to 70% by mass or more and less than 150% by mass; and performing drying of the polyethylene powder at a temperature of 105° C. while blowing an inert gas at a flow rate of 10 m$^3$/h or more to remove the volatilized solvent. The compacted apparent bulk density of the polyethylene powder can be measured by a method described in Examples described later.

(Compressive Strength at 10% Displacement of Particles Having Particle Diameter of 100 μm)

In the polyethylene powder of the present embodiment, the compressive strength (also referred to as "crushing strength") at 10% displacement of a polyethylene powder (particles) having a particle diameter of 100 μm is preferably 4.0 MPa or more and less than 10.0 MPa, more preferably 5.0 MPa or more and less than 9.0 MPa, and further preferably 6.0 MPa or more and less than 8.0 MPa. In the present embodiment, the particles having a particle diameter of 100 μm refer to particles of 100 μm±5 μm. The compressive strength at 10% displacement is a value obtained by applying load (test force) to one grain of the polyethylene powder by an indenter, measuring its deformation (compressive displacement), and measuring the compressive strength when the deformation reaches 10%.

When the compressive strength at 10% displacement of the polyethylene powder having a particle diameter of 100 m is 4.0 MPa or more, the generation of a fine powder and the production of particle aggregates due to the fracture and deformation of the polyethylene powder can be suppressed, and the adhesion of the powder to a reaction vessel, piping clogging, a decrease in sieving efficiency, and the like can thus be suppressed. In addition, for example, when a solvent such as a liquid paraffin and the powder are kneaded by an extruder, the dissolution of the powder is fast, and a uniform gel can easily be produced in a short time. On the other hand, when the compressive strength at 10% displacement of the polyethylene powder having a particle diameter of 100 μm is less than 10.0 MPa, the powder deforms when the powder is filled and compressed to be molded, and thus the fusion of the powder particles proceeds easily. As a result, the mechanical strength of the molded article tends to improve.

Examples of the method for adjusting the compressive strength at 10% displacement of the polyethylene powder having a particle diameter of 100 μm to 4.0 MPa or more and less than 10.0 MPa include performing continuous polymerization in which ethylene gas, a solvent, a catalyst, and the like are continuously supplied into a polymerization system and continuously discharged together with the produced polyethylene; introducing ethylene gas from two places, the bottom and middle portion of a reactor; using a solid catalyst having a compressive strength of less than 5 MPa as a catalyst and supplying it at the same temperature as the polymerization temperature; and adjusting the temperature of a flash tank to 50° C. or less and introducing an alcohol to deactivate the catalyst.

The compressive strength can be measured in quintuplicate using a microcompression testing machine MCT-510 from SHIMADZU CORPORATION under the conditions of a plane φ of 200 mm for the upper pressure indenter, a test force of 490.0 mN, and a load rate of 4.842 mN/s, and the compressive strength can be calculated by the following formula from the test force at the time of 10% displacement.

$$C(x)=2.48 \times P/(\pi \times d \times d)$$

C(x): compressive strength (MPa) at 10% displacement, P: test force (N) at 10% displacement of particle diameter, d: particle diameter (mm)

(Proportion of Component of Molecular Weight of Less Than 10,000)

In the polyethylene powder of the present embodiment, the proportion of a component having a molecular weight of less than 10,000 as determined by gel permeation chromatography (GPC) is preferably less than 5%, more preferably less than 4%, and further preferably less than 3%. In the polyethylene powder of the present embodiment, the lower limit of the proportion of a component having a molecular weight of less than 10,000 is, for example, 0.1%. In the polyethylene powder of the present embodiment, when the proportion of a component having a molecular weight of less than 10,000 is less than 5%, even the fine pores are easily maintained even if the powder is heated, and the solubility is thus excellent. Also, the air permeability of a resulting porous sintered body tends to improve. In addition, in the step of dissolving the powder in a solvent, the powder particles tend to be less likely to fuse during kneading.

For adjusting the proportion of a component having a molecular weight of less than 10,000 in the polyethylene powder to less than 5%, for example, the polyethylene powder can be synthesized using a general Ziegler-Natta catalyst or metallocene catalyst, but a catalyst described later is preferably used. In addition, the proportion of a component having a molecular weight of less than 10,000 in the polyethylene powder to less than 5% can be adjusted by, for example, performing continuous polymerization in which ethylene gas, a solvent, a catalyst, and the like are continuously supplied into a polymerization system and continuously discharged together with the produced polyethylene; introducing ethylene gas from two places, the bottom and middle portion of a reactor, and directing the ethylene gas supply ports to the side of the direction in which the stirring blade rotates; and adjusting the temperature of a flash tank to 50° C. or less and introducing an alcohol to deactivate the catalyst. The proportion of a component having a molecular weight of less than 10,000 in the polyethylene powder can be measured by a method described in Examples described later.

(Total Content of Al, Ti, Zr, and Hf)

In the polyethylene powder of the present embodiment, the total content of Al, Ti, Zr, and Hf is preferably 1 ppm or more and 10 ppm or less, more preferably 1.1 ppm or more and 9.0 ppm or less, and further preferably 1.2 ppm or more and 8.0 ppm or less. When the total content of Al, Ti, Zr, and Hf is 1.0 ppm or more, the generation of a fine powder and the production of particle aggregates due to the fracture and deformation of the polyethylene powder can be suppressed, and the adhesion of the powder to a reaction vessel, piping clogging, a decrease in sieving efficiency, and the like can be thus suppressed. On the other hand, when the total content of Al, Ti, Zr, and Hf is 10.0 ppm or less, the deterioration of the polyethylene due to heating is suppressed, and thus, embrittlement, discoloration, a decrease in mechanical properties, an increase in the unmelted material, and the like are less likely to occur, which leads to excellent long-term stability.

In the polyethylene powder of the present embodiment, the total content of Al, Ti, Zr, and Hf can be controlled, for example, by the productivity of polyethylene per unit catalyst. The productivity of polyethylene can be controlled, for example, by the polymerization temperature and polymerization pressure of the reactor and the slurry concentration in production. Specifically, example of the method for increasing the productivity of the polyethylene used in the present embodiment includes increasing the polymerization temperature, increasing the polymerization pressure, and/or increasing the slurry concentration. The catalyst used is not particularly limited, and, for example, a general Ziegler-Natta catalyst or metallocene catalyst is preferably used. Al, Ti, Zr, and Hf can also be removed from the polyethylene powder by, for example, washing the polyethylene powder with water or a weakly acidic aqueous solution. The total content of Al, Ti, Zr, and Hf can be measured by a method described in Examples described later.

(Chlorine Content)

The chlorine content of the polyethylene powder of the present embodiment is preferably less than 30 ppm, more preferably less than 20 ppm, further preferably less than 10 ppm, and still further preferably 0 ppm. When the chlorine content is less than 30 ppm, the deterioration of the polyethylene powder is suppressed, and thus, embrittlement, discoloration, a decrease in mechanical properties, and the like are less likely to occur, which leads to excellent long-term stability of the polyethylene powder. In addition, when the chlorine content is less than 30 ppm, the corrosion of a roll, a mold, and the like during fabrication is less likely to occur to suppress the contamination of contacted objects with the corrosive component.

The amount of chlorine contained in the polyethylene powder of the present embodiment can be controlled, for example, by adjusting the productivity of polyethylene per unit catalyst.

The productivity of the polyethylene powder can be controlled, for example, by the polymerization temperature and polymerization pressure of the reactor and the slurry concentration in production. Specifically, example of the method for increasing the productivity of the polyethylene used in the present embodiment includes increasing the polymerization temperature, increasing the polymerization pressure, and/or increasing the slurry concentration. In addition, the content of chlorine contained in the polyethylene powder can also be reduced by using a catalyst in which the amount of a chlorine component is small, for example.

The catalyst used is not particularly limited, and, for example, a general Ziegler-Natta catalyst or metallocene catalyst can be used, but in view of reducing the chlorine content, a metallocene catalyst described later is preferably used. The chlorine content can be measured by a method described in Examples described later.

(Method for Producing Polyethylene Powder)

Examples of the polyethylene polymerization method in the method for producing the polyethylene powder of the present embodiment include, but are not limited to, a method involving (co)polymerizing ethylene or monomers including ethylene by a slurry polymerization, a gas phase polymerization, or a solution polymerization. Among these, the slurry polymerization, in which polymerization heat can be efficiently removed, is preferred. In the slurry polymerization, for example, an inert hydrocarbon medium can be used as a medium, and further an olefin itself can also be used as a medium.

The inert hydrocarbon medium is not particularly limited, and specific examples include aliphatic hydrocarbons such as propane, butane, isobutane, pentane, isopentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethyl chloride, chlorobenzene, and dichloromethane; and mixtures thereof.

In the present embodiment, an inert hydrocarbon medium having 6 or more and 10 or less carbon atoms is preferably used. When the inert hydrocarbon medium has 6 or more carbon atoms, low molecular weight components produced by side reactions during ethylene polymerization and by the deterioration of polyethylene dissolve relatively easily, and can be easily removed in the step of separating polyethylene from the polymerization medium. On the other hand, when the inert hydrocarbon medium has 10 or less carbon atoms, the adhesion of the polyethylene powder to a reaction vessel, and the like are suppressed, which tends to enable industrially stable operation.

The polymerization temperature of polyethylene in the method for producing the polyethylene powder of the present embodiment is usually preferably 30° C. or more and 100° C. or less, more preferably 35° C. or more and 95° C. or less, and further preferably 40° C. or more and 90° C. or less. The polymerization temperature of 30° C. or more tends to enable industrially efficient production. The polymerization temperature of 100° C. or less enables continuous stable operation and an increased specific surface area of the polyethylene powder.

The polymerization pressure of polyethylene in the method for producing the polyethylene powder of the present embodiment is usually preferably normal pressure or more and 2.0 MPa or less, more preferably 0.1 MPa or more and 1.5 MPa or less, and further preferably 0.1 MPa or more and 1.0 MPa or less.

The polymerization reaction can be performed by any of batch, semicontinuous, and continuous methods, and especially, polymerization is preferably performed by a continuous method. By continuously supplying ethylene gas, a solvent, a catalyst, and the like into a polymerization system and continuously discharging the ethylene gas, the solvent, the catalyst, and the like together with the produced polyethylene powder, a partial high temperature state due to a sudden reaction of ethylene can be suppressed, and the interior of the polymerization system thus tends to be more stabilized.

In the method for producing the polyethylene powder of the present embodiment, the polymerization of polyethylene can also be performed in two or more stages in which the reaction conditions are different.

In the production of the polyethylene powder of the present embodiment, preferred examples of the catalyst component used for the polymerization of polyethylene include Ziegler-Natta catalysts, metallocene catalysts, and Phillips catalysts. As the Ziegler-Natta catalysts, those described in the specification of Japanese Patent No. 5767202 can be preferably used. As the metallocene catalysts, those described in, for example, Japanese Patent Laid-Open No. 2006-273977 and Japanese Patent No. 4868853 can be preferably used, but the metallocene catalyst is not limited thereto. In the production of the polyethylene powder of the present embodiment, a promoter such as triisobutylaluminum or the Tebbe reagent may be contained in the catalyst component used for the polymerization of polyethylene.

In the production of the polyethylene powder of the present embodiment, the average particle diameter of the catalyst used for the polymerization of polyethylene is preferably 0.1 μm or more and 20 μm or less, more preferably 0.2 μm or more and 16 μm or less, and further preferably 0.5 μm or more and 12 μm or less. When the average particle diameter of the catalyst used for the polymerization of polyethylene is 0.1 μm or more, problems such as the scattering and adhesion of the obtained polyethylene powder tend to be prevented. When the average particle diameter of the catalyst used for the polymerization of polyethylene is 10 μm or less, problems such as too large the polyethylene powder, which settles in the polymerization system or blocks the line in the polyethylene powder post-treatment step, tend to be prevented. The particle diameter distribution of the catalyst used for the polymerization of polyethylene is preferably as narrow as possible, and the fine powder and the coarse powder can also be removed by a sieve, centrifugation, or a cyclone.

In the production of the polyethylene powder of the present embodiment, the compressive strength of the catalyst used for the polymerization of polyethylene is preferably 5 MPa or less, more preferably 4 MPa or less, and further preferably 3 MPa or less. When the compressive strength of the catalyst used for the polymerization of polyethylene is 5 MPa or less, the compressive strength at 10% displacement of the polyethylene powder having a particle diameter of 100 μm, and the percentage decrease of the specific surface area before and after heating at 120° C. for 5 h tend to be easily adjusted within the scope of this application.

The method for deactivating the catalyst used for polymerizing polyethylene is not particularly limited but is preferably carried out in a flash tank immediately after polyethylene is polymerized in a reaction vessel. By deactivating the catalyst immediately after polymerization, the production of abnormal reaction products produced in the post-reaction after the polymerization can be suppressed, and further the total content of Al, Ti, Zr, and Hf, the content of chlorine, and the like derived from the catalyst component can be reduced. Examples of the agent for deactivating the catalyst include, but are not limited to, oxygen, water, hydrogen, alcohols, glycols, phenols, carbon monoxide, carbon dioxide, ethers, carbonyl compounds, and alkynes.

In the production of the polyethylene powder of the present embodiment, it is preferred to introduce ethylene gas as a starting material from two places, the bottom and middle portion of a polymerization reactor, and to direct the ethylene gas supply ports to the side of the direction in which the stirring blade rotates. Ethylene gas is introduced, for example, into the liquid phase in a polymerization reactor in parallel with the stirring shaft; however, when the ethylene concentration around the outlet of the ethylene introduction line is high, a sudden reaction of ethylene occurs easily, and the interior of the system thus tends to be nonuniform. Therefore, it is preferred to introduce ethylene gas into two places and direct the supply ports for ethylene gas to the side of the direction in which the stirring blade rotates so that the polymerization reaction does not proceed in a state in which the ethylene concentration is high.

The molecular weight of polyethylene can be adjusted by, for example, allowing hydrogen to be present in the polymerization system, or changing the polymerization temperature, as described in Germany Patent Application Laid-Open No. 3127133. By adding hydrogen to the polymerization system as a chain transfer agent, the molecular weight is easily controlled in a suitable range. When hydrogen is added to the interior of polymerization system, the mole fraction of hydrogen is preferably 0 mol % or more and 30 mol % or less, more preferably 0 mol % or more and 25 mol % or less, and further preferably 0 mol % or more and 20 mol % or less.

In view of adjusting the viscosity average molecular weight (Mv) of the polyethylene powder of the present embodiment, ethylene and hydrogen are preferably supplied from the gas phase. The hydrogen concentration based on ethylene in the gas phase is preferably 1 to 10,000 ppm, more preferably 10 to 7,000 ppm, and further preferably 30 to 6,000 ppm.

The solvent separation in the method for producing the polyethylene powder of the present embodiment can be performed, for example, by decantation, centrifugation, or filtration, and in view of productivity, the centrifugation is preferred. The amount of the solvent contained in polyethylene after solvent separation is not particularly limited but is preferably 70% by mass or more and less than 150% by mass, more preferably 75% by mass or more and less than 140% by mass, and further preferably 80% by mass or more and less than 130% by mass based on the mass of polyethylene. When the amount of the solvent contained in the polyethylene powder before drying is 70% by mass or more and less than 150% by mass, pores are easily formed and maintained by the volatilized solvent, and thus a polyethylene powder that is easily dissolved tends to be obtained. Further, the compressive strength at 10% displacement of the polyethylene powder having a particle diameter of 100 μm, and the percentage decrease of the specific surface area before and after heating at 120° C. for 5 h tend to easily fall within the range of the present application.

The drying temperature of the polyethylene powder in the method for producing the polyethylene powder of the present embodiment is usually preferably 100° C. or more and 110° C. or less, more preferably 101° C. or more and 109° C. or less, and further preferably 102° C. or more and 108° C. or less, and the polyethylene powder is most preferably dried at 105° C. When the drying temperature is 100° C. or more, efficient drying is possible. On the other hand, when the drying temperature is 110° C. or less, the pores in the polyethylene powder are maintained, and the percentage decrease of the specific surface area before and after heating at 120° C. for 5 h tends to easily fall within the range in the claims of the present application. Further, drying can be performed in a state in which the aggregation of the powder particles and thermal deterioration are suppressed. The drying time is preferably 0.5 h or more and less than 3 h.

Further, the drying of the polyethylene powder in the method for producing the polyethylene powder of the present embodiment is preferably performed while an inert gas is blown at a flow rate of 10 $m^3$/h or more to remove the volatilized solvent. By drying the polyethylene powder while removing the solvent, pores are easily formed and maintained, and the percentage decrease of the specific surface area before and after heating at 120° C. for 5 h also tends to easily fall within the range of the present application.

(Additives)

The polyethylene powder of the present embodiment can contain, in addition to each component as described above, other known components useful for the production of polyethylene. The polyethylene powder of the present embodiment, for example, may further contain additives such as a neutralizing agent, an antioxidant, and a light-resistant stabilizer.

The neutralizing agent is used as a catcher for chlorine contained in the polyethylene powder, a fabrication aid, or the like. The neutralizing agent is not particularly limited, and specific examples include stearates of alkaline earth metals such as calcium, magnesium, and barium. The content of the neutralizing agent is not particularly limited but is preferably 5,000 ppm or less, more preferably 4,000 ppm or less, and further preferably 3,000 ppm or less based on the total amount of the polyethylene powder, and the neutralizing agent need not be used.

The antioxidant is not particularly limited, and specific examples include phenol-based antioxidants such as dibutylhydroxytoluene, pentaerythritol-tetrakis[3-(3,5-di-t-butyl-4-hydroxyphenyl) propionate], and octadecyl-3-(3,5-di-t-butyl-4-hydroxyphenyl) propionate. The content of the antioxidant is not particularly limited but is preferably 5,000 ppm or less, more preferably 4,000 ppm or less, and further preferably 3,000 ppm or less based on the total amount of the polyethylene powder, and the antioxidant need not be used.

The light-resistant stabilizer is not particularly limited, and specific examples include benzotriazole-based light-resistant stabilizers such as 2-(5-methyl-2-hydroxyphenyl) benzotriazole and 2-(3-t-butyl-5-methyl-2-hydroxyphenyl)-5-chlorobenzotriazole; and hindered amine-based light-resistant stabilizers such as bis(2,2,6,6-tetramethyl-4-piperidine) sebacate and poly[{6-(1,1,3,3-tetramethylbutyl) amino-1,3,5-triazine-2,4-diyl}{(2,2,6,6-tetramethyl-4-piperidyl)imino}hexamethylene{(2,2,6,6-tetramethyl-4-piperidyl)imino}]. The content of the light-resistant stabilizer is not particularly limited but is preferably 5,000 ppm or less, more preferably 4,000 ppm or less, and further preferably 3,000 ppm or less based on the total amount of the polyethylene powder, and the light-resistant stabilizer need not be used.

The content of the additives contained in the polyethylene powder of the present embodiment can be obtained by extracting the additives in the polyethylene powder by Soxhlet extraction with tetrahydrofuran (THF) for 6 h, and separating the extract by liquid chromatography for quantification.

In the polyethylene powder of the present embodiment, polyethylene having a different viscosity average molecular weight, molecular weight distribution, and the like can also be blended, and other resins such as low density polyethylene, linear low density polyethylene, polypropylene, and polystyrene can also be blended. The form of the polyethylene used in the present embodiment is a powder form.

(Applications)

The polyethylene powder of the present embodiment obtained as described hereinabove can be applied to various applications by various fabrication methods. A molded article obtained by molding the polyethylene powder of the present embodiment has no defects and is uniform and excellent in strength and dimensional accuracy. Therefore, the polyethylene powder can be preferably used, for example, as a material for a microporous membrane, a fiber, a molded article in the form of a sheet or block, or a porous sintered body. Such a molded article is not particularly limited, and examples thereof include separators for secondary batteries, particularly separators for lithium ion secondary batteries and separators for lead storage batteries, high strength fibers, and compression-molded products. In addition, examples include using for gears, rolls, curtain rails, rails for pachinko balls, liner sheets for storage silos for grain and the like, sliding-providing coatings such as rubber products, ski materials and ski soles, and lining materials for heavy machinery such as trucks and shovel cars, by molding in a solid state through extrusion, pressing, or cutting, utilizing the features of excellent wear resistance, excellent high sliding properties, excellent high strength, and excellent high impact properties, the characteristics of ultrahigh molecular weight polyethylene. In addition, the polyethylene powder of the present embodiment can be used for filters, separation materials, trap materials, suction and conveyance sheets, and the like as a molded article obtained by sintering the polyethylene powder.

EXAMPLES

The present invention will be described in more detail below using Examples and Comparative Examples, but the present invention is not limited in any way by the following Examples.

[Methods for Measuring Various Characteristics and Properties]

(1) Limiting Viscosity [η]

20 mg of a polyethylene powder was added to 20 mL of decahydronaphthalene (decalin) (containing 1 g/L of dibutylhydroxytoluene (BHT)), and the mixture was stirred at 150° C. for 2 h for dissolution. For the solution, the falling time (ts) between the marked lines was measured in a constant temperature oven at 135° C. using a Cannon-Fenske viscometer (SO). In the same manner, also for samples in which the amount of the polyethylene powder was changed to 10 mg, 5 mg, and 2.5 mg, the falling time (ts) between the marked lines was measured in the same manner. The falling time (tb) of only decahydronaphthalene to which the polyethylene powder had not been added, as a blank, was measured. The specific viscosity (ηsp/C) of the polyethylene powder obtained according to the following formula A was plotted and extrapolated to zero concentration to obtain the limiting viscosity [η].

$$\eta sp/C=(ts/tb-1)/0.1 (\text{unit}:dL/g) \quad \text{formula A}$$

(2) Specific Surface Area and Slope of Linear Approximation Formula Measured by BET Method The specific surface area of a polyethylene powder was obtained by the BET method as follows. First, about 1 g of a polyethylene powder was placed in a glass tube, and heated and vacuum-degassed under a reduced pressure of about 100 mTorr at a temperature of 70° C. over about 18 h. Then, the adsorption isotherm at −196° C. was determined using a high performance analyzer for specific surface area and pore distribution of multispecimen (trade name: 3Flex, manufactured by Micromeritics Instrument Corp.) with krypton gas as an adsorption gas, and the specific surface area of the polyethylene powder was obtained from the multipoint BET plot. In addition, for the polyethylene powder after heating at 120° C. for 5 h, the specific surface area was measured by the same BET method. The specific surface area measured by the BET method before heating at 120° C. for 5 h was designated as A, and the specific surface area measured by the BET method after heating at 120° C. for 5 h was designated as B. The percentage decrease of the specific surface area before and after heating at 120° C. for 5 h was calculated by (A−B)/A×100.

For the heating of the polyethylene powder, an aluminum vat in which the polyethylene powder was placed was introduced into a GEER oven heated to 120° C., and heated in air.

The slope of the linear approximation formula of the amounts adsorbed in a relative pressure range of 0.120 to 0.200 was obtained from the slope of the linear approximation straight line of the amounts adsorbed ($cm^3/g$) measured at three or more points in a relative pressure range $P/P_0$ of 0.120 to 0.200 under the measurement conditions of the above BET method. Here, $P_0$ represents the saturated vapor pressure of the adsorption gas.

(3) Content of Particles Having Particle Diameter of Less Than 106 μm 100 g of a polyethylene powder was weighed into a 200 mL plastic cup, and 1 g of carbon black was added. The mixture was sufficiently stirred by a medicine spoon.

The stirred polyethylene powder was classified through sieves having openings of 300 μm, 212 μm, 150 μm, 106 μm, 75 μm, and 53 μm in accordance with the JIS Z 8801 standard.

The proportion of the weight of particles that passed through the sieve having an opening of 106 μm to all particles was obtained and used as the content of particles having a particle diameter of less than 106 μm.

(4) Content of Particles Having Particle Diameter of Less Than 53 μm

The proportion of the weight of particles that passed through the sieve having an opening of 53 μm to all particles was obtained in the same manner as the measurement of the above (3) and used as the content of particles having a particle diameter of less than 53 μm.

(5) Compacted Apparent Bulk Density

The compacted apparent bulk density of a polyethylene powder was measured by the method described in JIS K-7370: 2000.

(6) Compressive Strength at 10% Displacement

A polyethylene powder having a particle diameter of 100 μm for compressive strength measurement was classified through sieves having openings of 106 μm and 90 μm in accordance with the JIS Z 8801 standard, and a polyethylene powder in which the average value of the long side and the short side was about 100 μm was sorted by a system microscope BX43 manufactured by Olympus Corporation. Then, the measurement of compressive strength was performed using the optical monitor of a microcompression testing machine on the polyethylene powder in which the average value of the long side and the short side was 100 μm±5 μm.

The compressive strength was measured in accordance with JIS R 1639-5 using a microcompression testing machine MCT-510 from SHIMADZU CORPORATION. One grain of the polyethylene powder was placed on the lower sample stage, and the particle diameter was measured. Measurement was performed under the conditions of an upper pressure indenter having a plane ϕ of 200 mm, a test force of 490.0 mN, and a load rate of 4.842 mN/s. The measurement was carried out in quintuplicate, and the average value was used for evaluation. The compressive strength at 10% displacement was calculated by the following formula from the test force at the time of 10% displacement.

$$C(x)=2.48 \times P/(\pi \times d \times d)$$

C(x): compressive strength (MPa) at 10% displacement, P: test force (N) at 10% displacement of particle diameter, d: particle diameter (mm)

The particle diameter d was the average value of the long side and the short side of the polyethylene powder.

(7) Proportion of Components Having Molecular Weights of Less Than 10,000

For a sample solution prepared by mixing 20 mg of a polyethylene powder and 15 mL of o-dichlorobenzene and stirring the mixture at 150° C. for 1 h, the measurement by gel permeation chromatography (GPC) was performed under the following conditions. The number average molecular weight (Mn), the weight average molecular weight (Mw), and the molecular weight distribution (Mw/Mn) were obtained from the measurement results, based on a calibration curve made using commercial monodisperse polystyrene.

Apparatus: 150-C ALC/GPC manufactured by Waters Corporation

Detector: RI detector

Mobile phase: o-dichlorobenzene (for high performance liquid chromatograph)

Flow rate: 1.0 mL/min

Columns: one Shodex AT-807S manufactured by Showa Denko K.K. and two TSK-gelGMH-H6 manufactured by Tosoh Corporation that were coupled were used.

Column temperature: 140° C.

From the obtained GPC chart, the content of components having molecular weights of less than 10,000 in terms of polystyrene was obtained.

(8) Total Content of Al, Ti, Zr, and Hf

A polyethylene powder was pressure-decomposed using a microwave decomposition apparatus (model ETHOS TC, manufactured by Milestone General K.K.), and the elemental concentrations of Ti, Al, Zr, and Hf in the polyethylene powder were measured by an internal standard method using an ICP-MS (inductively coupled plasma mass spectrometer, model X Series X7, manufactured by Thermo Fisher Scientific K.K.).

(9) Chlorine Content

A polyethylene powder was burned by an automatic sample burning apparatus (AQF-100 manufactured by Mitsubishi Chemical Analytech Co., Ltd.) and then absorbed by an absorbing liquid (a mixed solution of $Na_2CO_3$ and $NaHCO_3$), and the absorbing liquid was injected into an ion chromatograph apparatus (manufactured by Dionex Corporation, ICS1500, columns (separation column: AS12A, guard column: AG12A), suppressor ASRS300) to measure the chlorine content.

(10) Evaluation of Solubility and Dispersibility

The solubility of a polyethylene powder and the dispersibility of polyethylene molecules were evaluated by making a polyethylene microporous membrane by the same method as in Examples except that the time of kneading the polyethylene powder and a liquid paraffin by an extruder was one third of the usual time, and determining the uniformity of the membrane thickness.

For the uniformity of the membrane thickness, the membrane thickness was measured in the central portion in the roll width direction at 50 points at intervals of 30 cm in the length direction with a contact thickness gauge, and the difference between the maximum value and minimum value was taken as the fluctuation range of the membrane thickness in the length direction. The determination criteria are as follows.

◯ . . . The fluctuation range is less than 1.0 μm, and there are no tears or pinholes.

Δ . . . The fluctuation range is 1.0 μm or more and less than 3.0 μm, and there are no tears or pinholes.

X . . . The fluctuation range is 3.0 μm or more, or there are tears and pinholes.

(11) Evaluation of Undissolved Polyethylene Powder (Fault) and Stain

A polyethylene microporous membrane was made by a method described in Examples, and visual observation was performed for 100 m$^2$ of the microporous membrane. The number of undissolved portions of polyethylene powder (faults) of 0.1 mm$^2$ or more per area of 10 m$^2$, and the number of stains of 0.5 mm or more on the microporous membrane surface were counted. The determination criteria are as follows.

⊚ . . . The number of faults is zero per 10 m$^2$, and there are no stains.

◯ . . . The number of faults is one per 10 m$^2$, and there are no stains.

Δ . . . The number of faults is two or more and less than five per 10 m$^2$, and there are no stains.

X . . . The number of faults is five or more per 10 m$^2$, or there are one or more stains.

(12) Evaluation of Strength and Air Permeability of Porous Sintered Body

A polyethylene porous sintered body was made by a method described in Examples, and the measurement of strength and air permeability was performed. The measurement of the air permeability of the porous sintered body was performed under the conditions of a measurement range of 20 cm$^2$ and a measurement differential pressure of 125 Pa using an air permeability measuring machine ("FX 3360 PORTAIR" manufactured by TEXTEST AG). The tensile breaking stress was measured in quintuplicate by the method described in JIS K 7127, and the average was taken as the value of the strength.

The tensile breaking stress (the ease of the fusion of the powder particles) and air permeability (the degree of disappearance of the pores) of the porous sintered body were evaluated by the following determination criteria.

⊚ . . . The air permeability is 15 SLB or more, and the tensile breaking stress is 3.5 MPa or more.

◯ . . . The air permeability is 15 SLB or more, and the tensile breaking stress is 2.8 MPa or more and less than 3.5 MPa.

◯ . . . The air permeability is 10 SLB or more and less than 15 SLB, and the tensile breaking stress is 3.5 MPa or more.

Δ . . . The air permeability is 10 SLB or more and less than 15 SLB, and the tensile breaking stress is 2.8 MPa or more and less than 3.5 MPa.

X . . . The air permeability is less than 10 SLB, or the tensile breaking stress is less than 2.8 MPa.

[Reference Examples] Catalyst Synthesis Examples
[Preparation of Solid Catalyst Component [A]]

1,300 mL of hexane was put in an 8 L stainless steel autoclave sufficiently purged with nitrogen. 600 mL of a 1 mol/L solution of titanium tetrachloride in hexane and 800 mL of a 1 mol/L solution of an organomagnesium compound represented by the composition formula AlMg$_5$(C$_4$H$_9$)$_{11}$(OSiH)$_2$ in hexane were simultaneously added over 30 min while stirring at 10° C. After the addition, the temperature was slowly increased, and the reaction was continued at 60° C. for 2 h. After the completion of the reaction, the supernatant liquid was removed followed by washing five times with 1,500 mL of hexane, to prepare a solid catalyst component [A]. The amount of titanium contained in 1 g of this solid catalyst component [A] was 2.39 mmol, and the compressive strength of the solid catalyst component [A] was 1.1 MPa.

[Preparation of Solid Catalyst Component [B]]
(1) (B-1) Synthesis of Support

An 8 L stainless steel autoclave sufficiently purged with nitrogen was charged with 1,000 mL of a 2.5 mol/L solution of hydroxytrichlorosilane in hexane, and 2,300 mL of a solution of an organomagnesium compound represented by the composition formula AlMg$_5$(C$_4$H$_9$)$_{11}$(OC$_4$H$_9$)$_2$ in hexane (corresponding to 2.68 mol of magnesium) was dropped over 3 h while stirring at 55° C. Further, the temperature was increased to 70° C., and the reaction was continued for 1 h with stirring. After the completion of the reaction, the supernatant liquid was removed followed by washing five times with 1,600 mL of hexane. This solid ((B-1) support) was analyzed, and as a result, the amount of magnesium contained per g of the solid was 6.93 mmol.

(2) Preparation of Solid Catalyst Component [B]

110 mL of a 1 mol/L titanium tetrachloride solution in hexane and 110 mL of a 1 mol/L solution of an organomagnesium compound represented by the composition formula AlMg$_5$(C$_4$H$_9$)$_{11}$(OSiH)$_2$ in hexane were simultaneously added to 1,800 mL of a hexane slurry containing 110 g of the (B-1) support over 30 min while stirring at 15° C. After the addition, the reaction was continued at 15° C. for 1.5 h. After the completion of the reaction, the supernatant liquid was removed followed by washing five times with 1,300 mL of hexane, to prepare a solid catalyst component [B]. The amount of titanium contained in 1 g of this solid catalyst component [B] was 0.62 mmol, and the compressive strength of the solid catalyst component [B] was 2.3 MPa.

[Preparation of Supported Metallocene Catalyst Component [C]]

Spherical silica having an average particle diameter of 6 μm, a surface area of 650 m$^2$/g, an intraparticle pore volume of 2.1 mL/g, and a compressive strength of 1.5 MPa was calcined in a nitrogen atmosphere at 500° C. for 6 h for dehydration. The amount of the surface hydroxyl groups of the dehydrated silica was 1.82 mmol per gram of SiO$_2$. 40 g of this dehydrated silica was dispersed in 800 mL of hexane in an autoclave having a capacity of 1.8 L in a nitrogen atmosphere to obtain a slurry. While the obtained slurry was kept at 30° C. under stirring, 80 mL of a hexane solution of triethylaluminum (concentration 1 mol/L) was added. Then, the mixture was stirred for 3 h to react the triethylaluminum and the surface hydroxyl groups of the silica to obtain a component [a] containing a supernatant liquid and triethylaluminum-treated silica having surface hydroxyl groups capped with triethylaluminum. Then, the supernatant liquid in the obtained reaction mixture was removed followed by washing five times with 800 mL of hexane, to obtain 880 mL of a hexane slurry of triethylaluminum-treated silica.

On the other hand, 200 mmol of [(N-t-butylamido) (tetramethyl-η5-cyclopentadienyl)dimethylsilane]titanium-1, 3-pentadiene (hereinafter described as a "titanium complex") was dissolved in 1,200 mL of Isopar E [the trade name of a hydrocarbon mixture manufactured by Exxon Chemical Company (US)], and 18 mL of a 1.1 mol/L solution, in hexane, of the formula $AlMg_6(C_2H_5)_3(n-C_4H_9)_{12}$ previously synthesized from triethylaluminum and dibutylmagnesium was added. Further, hexane was added to adjust the titanium complex concentration to 0.1 mol/L to obtain a component [b].

In addition, 5.6 g of bis(hydrogenated tallow alkyl)methylammonium-tris(pentafluorophenyl) (4-hydroxyphenyl) borate (hereinafter described as a "borate") was added to 50 mL of toluene and dissolved to obtain a 100 mmol/L solution of the borate in toluene. 10 mL of a 1 mol/L solution of ethoxydiethylaluminum in hexane was added to this solution of the borate in toluene at room temperature, and further hexane was added so that the borate concentration in the solution was 70 mmol/L. Then, the solution was stirred at room temperature for 3 h to obtain a reaction mixture containing the borate.

45 mL of this reaction mixture containing the borate was added to 800 mL of the slurry of the component [a] obtained above while stirring at 35° C. to support the borate on silica. Thus, a slurry of silica supporting the borate was obtained. Further, 32 mL of the component [b] obtained above was added, and the mixture was stirred for 3 h to react the titanium complex and the borate. Thus, a supported metallocene catalyst [C] (hereinafter also referred to as a solid catalyst component [C]), which contained a supernatant liquid and silica with a catalytically active species formed thereon.

Then, the supernatant liquid was removed followed by washing two times with 1,000 mL of hexane, to remove the unreacted triethylaluminum in the supernatant liquid. The compressive strength of the supported metallocene catalyst component [C] was 1.4 MPa.

[Preparation of Supported Metallocene Catalyst Component [D]]

A supported metallocene catalyst component [D] was obtained by the same manner as in the method for preparing the supported metallocene catalyst component [C], except that spherical silica having an average particle diameter of 7 μm, a surface area of 450 m$^2$/g, an intraparticle pore volume of 1.7 mL/g, and a compressive strength of 6.0 MPa was used. The compressive strength of the supported metallocene catalyst component [D] was 5.9 MPa.

Example 1

(Polyethylene Polymerization Step)

Hexane, ethylene, hydrogen, and a catalyst were continuously supplied to a vessel type 300 L polymerization reactor equipped with a stirring apparatus. The polymerization pressure was 0.5 MPa. The polymerization temperature was kept at 83° C. by jacket cooling. Hexane was adjusted to 30° C. and supplied from the bottom of the polymerization vessel at 40 L/h, and ethylene gas was supplied from two places, the bottom of the polymerization vessel and the middle between the liquid surface and the bottom, from piping of which supply ports were directed to the side of the direction in which the stirring blade rotated.

The solid catalyst component [A] was used as a main catalyst, and triisobutylaluminum was used as a promoter. The solid catalyst component [A] slurried with hexane was adjusted to the same temperature as the polymerization temperature and added from the bottom of the polymerization vessel at a rate of 0.2 g/h, and triisobutylaluminum was added from the bottom of the polymerization vessel at a rate of 10 mmol/h. The polyethylene production rate was 14.1 kg/h. Hydrogen was continuously supplied using a pump so that the hydrogen concentration based on gas phase ethylene was 11.00 mol %. The catalytic activity was 40,000 g-PE/g-solid catalyst component [A]. The polymerization slurry was continuously removed to a flash tank at a pressure of 0.05 MPa and a temperature of 45° C. so that the level of the polymerization reactor was kept constant, and the unreacted ethylene and hydrogen were separated. 1-Butanol was continuously fed to the flash tank at a rate of 50 mmol/h.

Next, the polymerization slurry was continuously fed to a centrifuge so that the level of the polymerization reactor was kept constant, and the polymer was separated from the solvent and components other than the polymer. The content of the solvent and other components based on the polymer at the time was 87% by mass.

The separated polyethylene powder was dried at a temperature of 105° C. while nitrogen gas was blown at a flow rate of 10 m$^3$/h or more to remove the volatilized solvent. 1,500 ppm of calcium stearate (manufactured by DAINICHI CHEMICAL INDUSTRY CO., LTD., C60) was added to the obtained polyethylene powder, and they were uniformly mixed using a Henschel mixer. The obtained polyethylene powder was passed through a sieve having an opening of 425 μm to remove particles that did not pass through the sieve, to thereby obtain a polyethylene powder. The characteristics of the obtained polyethylene powder are shown in Table 1.

(Method for Producing Microporous Membrane)

0.3 Parts by mass of pentaerythritol-tetrakis-[3-(3,5-di-t-butyl-4-hydroxyphenyl) propionate] as an antioxidant was added to 100 parts by mass of the polyethylene powder, and they were dry-blended using a tumbler blender to obtain a polyethylene powder mixture. After purging with nitrogen, the obtained polyethylene powder mixture was introduced into a twin-screw extruder via a feeder under a nitrogen atmosphere. Further, 65 parts of a liquid paraffin (P-350 (trademark) manufactured by MATSUMURA OIL Co., Ltd.) was introduced into the extruder through a side feed, and the mixture was kneaded under the condition of 200° C., extruded from a T-die mounted at the extruder tip, and then immediately cooled and solidified by a cast roll cooled to 25° C., to form a gel-like sheet having a thickness of 1500 μm.

This gel-like sheet was stretched to a draw ratio of 7×7 at 120° C. using a simultaneous biaxial stretching machine, and then this stretched film was immersed in methylene chloride to extract and remove the liquid paraffin, and then dried. Next, the film was restretched to a draw ratio of 1.2×1.2 and then heat-treated at 125° C. for 20 s to obtain a microporous membrane having a thickness of 6 μm. Further, a microporous membrane roll having a width of 1500 mm and a winding length of 2300 m was obtained at a conveyance rate of 30 m/min during winding up.

(Method for Producing Porous Sintered Body)

The polyethylene powder was classified through sieves in accordance with the JIS Z 8801 standard, and a polyethylene powder that passed through an opening of 150 μm but did not pass through an opening of 53 μm was used as a material for a porous sintered body. 0.3 Parts by mass of polyoxyethylene sorbitan monolaurate was added to 100 parts by mass of the obtained polyethylene powder, and they were mixed by a blender. The polyethylene powder mixture was introduced into a hopper, and a roller in the lower portion of the hopper was rotated at a movement rate (circumference) of 9.5 cm/min to supply the resin. The supplied resin was deposited to a thickness of 0.505 mm on a metal endless conveyor belt rotating at a movement rate of 10 cm/min. Next, the resin was passed through a heating zone set at 200° C. over 10 min. The resin temperature at the outlet of the heating zone was 190° C. The resin was peeled from the endless conveyor belt while winding it around a roll, to obtain a porous sintered body.

Example 2

The polyethylene powder of Example 2 was obtained in the same manner as in Example 1 except that in the polymerization step, the polymerization temperature was 78° C., the polymerization pressure was 0.30 MPa, and the hydrogen concentration was 2.31 mol %. The microporous membrane and porous sintered body of Example 2 were obtained in the same manner as in Example 1 except that the polyethylene powder of Example 2 was used. The characteristics of the obtained polyethylene powder are shown in Table 1.

Example 3

The polyethylene powder of Example 3 was obtained in the same manner as in Example 1 except that in the polymerization step, the polymerization temperature was 78° C., the polymerization pressure was 0.35 MPa, the hydrogen concentration was 2.60 mol %, the solid catalyst component [B] was used instead of the solid catalyst component [A], and the addition rate of triisobutylaluminum was 8 mmol/h. The microporous membrane and porous sintered body of Example 3 were obtained in the same manner as in Example 1 except that the polyethylene powder of Example 3 was used. The characteristics of the obtained polyethylene powder are shown in Table 1.

Example 4

The polyethylene powder of Example 4 was obtained in the same manner as in Example 1 except that in the polymerization step, the polymerization temperature was 69° C., the polymerization pressure was 0.35 MPa, no hydrogen was used, 1.02 mol % of 1-butene based on ethylene was introduced from the gas phase, and 1-butanol was not supplied to the flash tank. The microporous membrane and porous sintered body of Example 4 were obtained in the same manner as in Example 1 except that the polyethylene powder of Example 4 was used. The characteristics of the obtained polyethylene powder are shown in Table 1.

Example 5

The polyethylene powder of Example 5 was obtained in the same manner as in Example 1 except that in the polymerization step, the polymerization temperature was 75° C., the polymerization pressure was 0.51 MPa, the hydrogen concentration was 0.13 mol %, the solid catalyst component [B] was used instead of the solid catalyst component [A], and the addition rate of triisobutylaluminum was 9 mmol/h. The microporous membrane and porous sintered body of Example 5 were obtained in the same manner as in Example 1 except that the polyethylene powder of Example 5 was used. The characteristics of the obtained polyethylene powder are shown in Table 1.

Example 6

The polyethylene powder of Example 6 was obtained in the same manner as in Example 1 except that in the polymerization step, the polymerization temperature was 70° C., the polymerization pressure was 0.80 MPa, the hydrogen concentration was 0.01 mol %, and the solid catalyst component [C] was used instead of the solid catalyst component [A]. The microporous membrane and porous sintered body of Example 6 were obtained in the same manner as in Example 1 except that the polyethylene powder of Example 6 was used. The characteristics of the obtained polyethylene powder are shown in Table 1.

Example 7

The polyethylene powder of Example 7 was obtained in the same manner as in Example 1 except that in the polymerization step, the polymerization temperature was 65° C., the polymerization pressure was 0.55 MPa, no hydrogen was used, and the solid catalyst component [D] was used instead of the solid catalyst component [A]. The microporous membrane and porous sintered body of Example 7 were obtained in the same manner as in Example 1 except that the polyethylene powder of Example 7 was used. The characteristics of the obtained polyethylene powder are shown in Table 1.

Example 8

The polyethylene powder of Example 8 was obtained in the same manner as in Example 1 except that in the polymerization step, the polymerization temperature was 75° C., the polymerization pressure was 0.55 MPa, the hydrogen concentration was 0.20 mol %, the solid catalyst component [B] was used instead of the solid catalyst component [A], and the addition rate of triisobutylaluminum was 9 mmol/h. The microporous membrane and porous sintered body of Example 8 were obtained in the same manner as in Example 1 except that the polyethylene powder of Example 8 was used. The characteristics of the obtained polyethylene powder are shown in Table 1.

Comparative Example 1

The polyethylene powder of Comparative Example 1 was obtained in the same manner as in Example 1 except that in the polymerization step, the polymerization temperature was 66° C., the polymerization pressure was 0.49 MPa, no hydrogen was used, and the solid catalyst component [A] was adjusted at 40° C. and added. The microporous membrane and porous sintered body of Comparative Example 1 were obtained in the same manner as in Example 1 except that the polyethylene powder of Comparative Example 1 was used. The characteristics of the obtained polyethylene powder are shown in Table 1.

Comparative Example 2

The polyethylene powder of Comparative Example 2 was obtained in the same manner as in Example 1 except that in the polymerization step, the polymerization temperature was 65° C., the polymerization pressure was 0.26 MPa, no hydrogen was used, 2.56 mol % of 1-butene based on ethylene was introduced from the gas phase, 1-butanol was not supplied to the flash tank, and drying was performed at 88° C. The microporous membrane and porous sintered body of Comparative Example 2 were obtained in the same manner as in Example 1 except that the polyethylene powder of Comparative Example 2 was used. The characteristics of the obtained polyethylene powder are shown in Table 1.

Comparative Example 3

Ethylene and hydrogen (8.25 mol %) were supplied to a vessel type 30 L polymerization reactor equipped with a stirring apparatus in which 14 L (total amount) of hexane was placed, and the polymerization pressure was 0.30 MPa. 1.0 mmol of triisobutylaluminum as a promoter was added. Then the solid catalyst component [A] was adjusted to the same temperature as the polymerization temperature, and 0.02 g of the solid catalyst component [A] was added to initiate a polymerization reaction. Ethylene gas was fed at a constant rate of 0.25 L/min from each of two places, the bottom of the polymerization vessel and the middle between the liquid surface and the bottom, from piping of which supply ports were directed to the side of the direction in which the stirring blade rotated, and the polymerization pressure was maintained at 0.30 MPa. The polymerization temperature was kept at 73° C. (polymerization initiation temperature) to 78° C. (the highest temperature reached) by jacket cooling.

After a lapse of 3 h, the polymerization temperature was decreased to 45° C., and depressurization was performed to remove the unreacted ethylene and hydrogen. The interior of polymerization system was purged with nitrogen, and then methanol was poured into the polymerization slurry to completely stop the polymerization reaction. The catalytic activity was 45,000 g-PE/g-solid catalyst component [A].

Next, the polymerization slurry was fed to a filtration vessel with a filter, and the polymer was separated from the solvent. The content of the solvent and others based on the polymer at the time was 145%.

Then, the polyethylene powder of Comparative Example 3 was obtained in the same manner as in Example 1. The microporous membrane and porous sintered body of Comparative Example 3 were obtained in the same manner as in Example 1 except that the polyethylene powder of Comparative Example 3 was used. The characteristics of the obtained polyethylene powder are shown in Table 1.

Comparative Example 4

Hexane, ethylene, hydrogen, and a catalyst were continuously supplied to a vessel type 300 L polymerization reactor equipped with a stirring apparatus. The polymerization pressure was 0.5 MPa. The polymerization temperature was kept at 83° C. by jacket cooling. Hexane was adjusted to 30° C. and supplied from the bottom of the polymerization vessel at 40 L/h, and ethylene gas was supplied from the bottom of the polymerization vessel from piping of which a supply port was directed directly downward.

The solid catalyst component [A] was used as a main catalyst, and triisobutylaluminum was used as a promoter. The solid catalyst component [A] slurried with hexane was adjusted to 30° C. and added from the bottom of the polymerization vessel at a rate of 0.2 g/h, and triisobutylaluminum was added from the bottom of the polymerization vessel at a rate of 10 mmol/h. The polyethylene production rate was 13.1 kg/h. Hydrogen was continuously supplied by a pump so that the hydrogen concentration based on gas phase ethylene was 11.00 mol %. The catalytic activity was 42,000 g-PE/g-solid catalyst component [A]. The polymerization slurry was continuously removed to a flash tank at a pressure of 0.05 MPa and a temperature of 60° C. so that the level of the polymerization reactor was kept constant, and the unreacted ethylene and hydrogen were separated.

Next, the polymerization slurry was continuously fed to a centrifuge so that the level of the polymerization reactor was kept constant, and the polymer was separated from the solvent and components other than the polymer. The content of the solvent and other components based on the polymer at the time was 42%.

The separated polyethylene powder was dried at a temperature of 95° C. 1,500 ppm of calcium stearate (manufactured by DAINICHI CHEMICAL INDUSTRY CO., LTD., C60) was added to the obtained polyethylene powder, and they were uniformly mixed using a Henschel mixer. The obtained polyethylene powder was passed through a sieve having an opening of 425 μm to remove particles that did not pass through the sieve, to thereby obtain a polyethylene powder. The microporous membrane and porous sintered body of Comparative Example 4 were obtained in the same manner as in Example 1 except that the polyethylene powder of Comparative Example 4 was used. The characteristics of the obtained polyethylene powder are shown in Table 1.

TABLE 1

| | | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|
| Limiting viscosity [η] | dL/g | 3.6 | 7.3 | 7.4 | 16.4 | 17.2 | 18.5 | 19.2 | 12.5 | 21.0 | 16.4 | 5.1 | 3.8 |
| Slope of linear approximation formula of amounts adsorbed in a relative pressure range of 0.120 to 0.200 | — | 0.10 | 0.08 | 0.12 | 0.16 | 0.15 | 0.18 | 0.22 | 0.13 | 0.21 | 0.25 | 0.20 | 0.22 |
| Percentage decrease in specific surface area measured by BET method before and after heating at 120° C. for 5 h | % | 34 | 18 | 23 | 30 | 12 | 19 | 12 | 20 | 7 | 36 | 38 | 42 |

TABLE 1-continued

|  |  | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|
| Specific surface area measured by BET method after heating at 120° C. for 5 h | $m^2/g$ | 0.14 | 0.14 | 0.20 | 0.11 | 0.29 | 0.33 | 0.36 | 0.25 | 0.38 | 0.07 | 0.37 | 0.09 |
| Content of particle of particle diameter of less than 106 μm | % by mass | 20 | 29 | 42 | 33 | 38 | 29 | 0.66 | 0.57 | 52 | 58 | 5 | 22 |
| Content of particle of particle diameter of less than 53 μm | % by mass | 0.1 | 0.1 | 1.4 | 2.8 | 2.1 | 0.1 | 9.5 | 7.2 | 5.1 | 4.8 | 0.0 | 5.2 |
| Compacted apparent bulk density | $g/cm^3$ | 0.57 | 0.59 | 0.56 | 0.55 | 0.55 | 0.51 | 9.2 | 3.7 | 0.49 | 0.48 | 0.53 | 0.53 |
| Compressive strength at 10% displacement of particles having particle diameter of 100 μm | MPa | 4.8 | 4.7 | 5.8 | 4.1 | 6.3 | 8.1 | 28 | 11 | 3.6 | 3.8 | 5.5 | 3.5 |
| Proportion of component having molecular weight of less than 10,000 as determined by gel permeation chromatography (GPC) | % | 2.9 | 1.2 | 0.9 | 0.3 | 0.6 | 0.1 | 0.1 | 0.8 | 0.9 | 5.1 | 5.6 | 6.2 |
| Total content of Al, Ti, Zr, and Hf | ppm | 3.4 | 3.2 | 3.8 | 3.3 | 4.2 | 7.0 | 23 | 33 | 3.8 | 13 | 11 | 11 |
| Chlorine content | ppm | 8 | 9 | 18 | 26 | 19 | 0 | 2.6 | 1.8 | 35 | 36 | 44 | 31 |
| Solubility and dispersibility | — | ○ | ○ | ○ | Δ | ○ | ○ | Δ | ○ | X | X | X | X |
| Undissolved polyethylene powder and stains | — | ○ | ○ | ○ | ○ | Δ | ○ | Δ | ○ | X | X | X | X |
| Strength and air permeability of porous sintered body | — | ◎ | ◎ | ◎ | ○ | ○ | ○ | ○ | ◎ | X | X | X | Δ |

The present application is based on Japanese Patent Application No. 2019-037372 filed on Mar. 1, 2019, the contents of which are incorporated herein by reference.

INDUSTRIAL APPLICABILITY

The polyethylene powder of the present invention has an optimum percentage decrease of the specific surface area before and after heating and is excellent in solubility and fabricability. Further, a molded article obtained by molding the polyethylene powder of the present invention, for example, a microporous membrane, a high strength fiber, a porous sintered body, and the like, is excellent in dimensional accuracy, strength, air permeability, and the like and therefore has high industrial applicability.

The invention claimed is:

1. A polyethylene powder having a limiting viscosity [η] of 2.0 dl/g or more and less than 20.0 dl/g as measured in decalin at 135° C., wherein
the polyethylene powder presents a percentage decrease from a specific surface area A measured by the BET method before heating at 120° C. for 5 h to a specific surface area B measured by a BET method after heating at 120° C. for 5 h, ((A−B)/A×100), of 0.1% or more and less than 35%.

2. The polyethylene powder according to claim 1, wherein the polyethylene powder presents a slope of a linear approximation formula obtained from amounts adsorbed in a relative pressure range of 0.120 to 0.200, as measured by the BET method, of 0.03 or more and less than 0.20.

3. The polyethylene powder according to claim 1, wherein the polyethylene powder has a specific surface area of 0.05 $m^2/g$ or more and less than 0.35 $m^2/g$ as measured by the BET method after heating at 120° C. for 5 h.

4. The polyethylene powder according to claim 1, wherein the percentage decrease from the specific surface area A measured by the BET method before heating at 120° C. for 5 h to the specific surface area B measured by the BET method after heating at 120° C. for 5 h, ((A−B)/A×100), is 10% or more and less than 35%.

5. The polyethylene powder according to claim 1, wherein the polyethylene powder presents a slope of the linear approximation formula obtained from the amounts adsorbed in a relative pressure range of 0.120 to 0.200, as measured by the BET method, of 0.07 or more and less than 0.18.

6. The polyethylene powder according to claim 1, wherein a content of a particle having a particle diameter of less than 106 μm is 10.0% by mass or more and less than 50.0% by mass, and
a content of a particle having a particle diameter of less than 53 μm is less than 3.0% by mass.

7. The polyethylene powder according to claim 1, wherein the polyethylene powder has a compacted apparent bulk density of 0.50 $g/cm^3$ or more and 0.65 $g/cm^3$ or less.

8. The polyethylene powder according to claim 1, wherein a compressive strength at 10% displacement of a particle having a particle diameter of 100 μm is 4.0 MPa or more and less than 10.0 MPa.

9. The polyethylene powder according to claim 1, wherein a proportion of a component having a molecular weight of less than 10,000 as determined by gel permeation chromatography (GPC) is less than 5%.

10. The polyethylene powder according to claim 1, wherein a total content of Al, Ti, Zr, and Hf is 1 ppm or more and 10 ppm or less, and a content of chlorine is less than 30 ppm.

11. A molded article obtained by molding the polyethylene powder according to claim 1.

12. The molded article according to claim 11, wherein the molded article is a microporous membrane, a high strength fiber, or a porous sintered body.

13. The polyethylene powder according to claim 2, wherein the polyethylene powder has a specific surface area of 0.05 $m^2$/g or more and less than 0.35 $m^2$/g as measured by the BET method after heating at 120° C. for 5 h.

14. The polyethylene powder according to claim 2, wherein the percentage decrease from the specific surface area A measured by the BET method before heating at 120° C. for 5 h to the specific surface area B measured by the BET method after heating at 120° C. for 5 h, ((A−B)/A×100), is 10% or more and less than 35%.

15. The polyethylene powder according to claim 3, wherein the percentage decrease from the specific surface area A measured by the BET method before heating at 120° C. for 5 h to the specific surface area B measured by the BET method after heating at 120° C. for 5 h, ((A−B)/A×100), is 10% or more and less than 35%.

16. The polyethylene powder according to claim 13, wherein the percentage decrease from the specific surface area A measured by the BET method before heating at 120° C. for 5 h to the specific surface area B measured by the BET method after heating at 120° C. for 5 h, ((A−B)/A×100), is 10% or more and less than 35%.

17. The polyethylene powder according to claim 2, wherein the polyethylene powder presents a slope of the linear approximation formula obtained from the amounts adsorbed in a relative pressure range of 0.120 to 0.200, as measured by the BET method, of 0.07 or more and less than 0.18.

18. The polyethylene powder according to claim 3, wherein the polyethylene powder presents a slope of the linear approximation formula obtained from the amounts adsorbed in a relative pressure range of 0.120 to 0.200, as measured by the BET method, of 0.07 or more and less than 0.18.

19. The polyethylene powder according to claim 4, wherein the polyethylene powder presents a slope of the linear approximation formula obtained from the amounts adsorbed in a relative pressure range of 0.120 to 0.200, as measured by the BET method, of 0.07 or more and less than 0.18.

20. The polyethylene powder according to claim 13, wherein the polyethylene powder presents a slope of the linear approximation formula obtained from the amounts adsorbed in a relative pressure range of 0.120 to 0.200, as measured by the BET method, of 0.07 or more and less than 0.18.

* * * * *